United States Patent [19]

Brown

[11] Patent Number: 4,939,368
[45] Date of Patent: Jul. 3, 1990

[54] POLYCHROMATIC OPTICAL STRAIN GAUGE

[75] Inventor: Stuart B. Brown, Sommerville, Mass.

[73] Assignee: Massachusetts Institute of Technology, Sommerville, Mass.

[21] Appl. No.: 337,317

[22] Filed: Apr. 13, 1989

[51] Int. Cl.$^5$ .............................................. G01D 5/34
[52] U.S. Cl. .................................. 250/231.10; 73/800; 356/35.5; 356/354
[58] Field of Search ............... 250/231 R, 237 G, 550; 350/162.16; 350/162.16; 356/32, 35.5, 354, 800, 162.18, 162.22, 162.23, 162.24

[56] References Cited

U.S. PATENT DOCUMENTS

| | | | |
|---|---|---|---|
| 3,184,961 | 5/1965 | Bell | 73/800 |
| 4,690,552 | 9/1987 | Grant | 356/35.5 |
| 4,717,253 | 6/1988 | Pratt, Jr. | 356/32 |
| 4,761,073 | 8/1988 | Meltz et al. | 356/32 |
| 4,777,358 | 10/1988 | Nelson | 250/225 |

OTHER PUBLICATIONS

Bell, "Determination of Dynamic Plastic Strain Through the Use of Diffraction Gratings", *Journal of Applied Physics*, vol. 27, Oct. 1956, p. 1109.
Boone, "A Method for Directly Determining Surface Strain Fields Using Diffraction Gratings", *Experimental Mechanics*, Nov. 1971, p. 481.
Chaing, "Moire Methods of Strain Analysis", *Manual on Experimental Stress Analysis SESA, Third Edition*, Aug. 1979, p. 290.
Creighton et al., "The Laser Extensometer", *Sensors*, Aug. 1986, p. 43.
Hercher et al., "Non-Contact Laser Extensometer", Presented at O-E Lase '87 Conference of SPIE, Jan. 1987, Los Angeles.
Hartman, "Application of the Diffraction Grating Strain Gauge Technique for Measuring Strains and Rotations During Elastic Impact of Rods", *Experimental Mechanics*, Dec. 1984, p. 509
Liu et al., Noncontacting Laser Diffraction Strain Extensometer for Material Properties Characterization at High Temperatures, May, 1989.
Optra Inc., Catalogue.
Parks, *Optical Engineering*, vol. 21, 1982, p. 633.
Post, "Optical Interference for Deformation Measurements Classical, Holographic, and Moire Interferometry", Mechanics of Nondestructive Testing, Ed. Stinchcomb, Plenum Press. NY, 1980, p. 1.
Post, "Moire Interferometry for Deformation and Strain Studies", *Optical Engineering*, Jul/Aug., 1985, vol. 24, p. 663.
Ray, et al., "Diffraction Grating Studies of Yield in Mild Steel Under Impact Loading", *Proceedings of the conference on Mechanical Properties of Materials at High Rates of Strain*, p. 224, 1974.
Ruby, et al., "The Use of Diffraction Techniques for the Study of In Plane Distortions of X-Ray Masks", J. Vac. Sci. Technol., vol. 5, Jan/Feb. 1987, p. 272.

(List continued on next page.)

Primary Examiner—David C. Nelms
Assistant Examiner—George C. Beck
Attorney, Agent, or Firm—Fish & Richardson

[57] ABSTRACT

A method and apparatus for measuring strain of an object is provided. The object to be measured is provided with a diffraction grating which is illuminated with radiation including at least two frequencies to produce an interference pattern. At least a portion of the interference pattern corresponding to at least one of the frequencies is detected and analyzed to determine strain. In some embodiments, the frequency of a portion of the diffraction pattern is detected, for example, by a human eye and the detected frequency compared with known frequencies to determine strain. In other embodiments, the relative angular position of portions of the pattern corresponding to different frequencies is detected. Since the relative angular position and intensity is affected by strain but not by certain rigid body rotations, strain measurement free of body rotation error may be made.

33 Claims, 2 Drawing Sheets

OTHER PUBLICATIONS

Sciammeralla et al., "Two New Optical Techniques to Measure Strain", *Experimental Mechanics*, Aug. 1974, p. 311.

Sevenhuijsen, "The Development of a Laser Grating Method for the Measurement of Strain Distributions in Plane, Opaque Surfaces", VDI-Brichtenr, vol. 313, 1978, p. 43.

Weisman, et al., "Full Field Displacement and Strain Rosettes by Moire Interferometry", Experimental Mechanics, Sept. 1982, p. 324.

Yamamoto et al., "Direct Measurement of Piezoelectric Electric Stream Using Diffraction Grating", *Journal of American Ceramic Society*, 1987, p. 557.

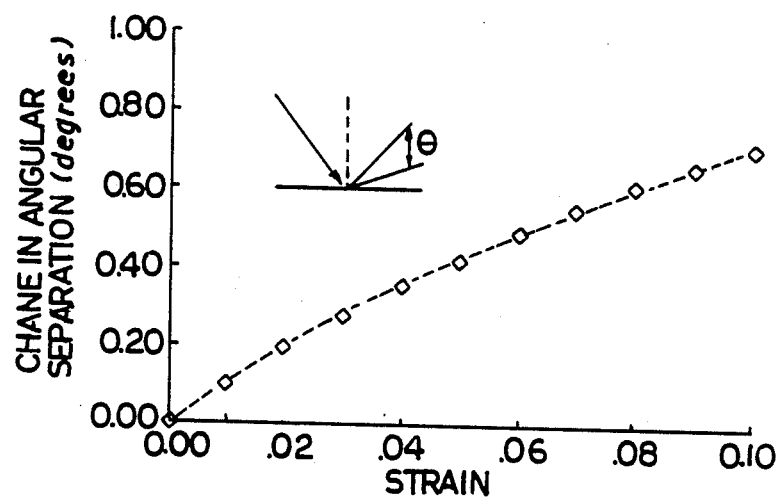
FIG.3 CHANGE IN ANGULAR SEPARATION OF OF DIFFRACTED FIRST ORDERS OF 45 DEGREE, DICHROMATIC INCIDENT BEAM WITH 488 AND 515 nm WAVELENGTHS. DIFFRACTION GRATING WITH 500 LINES/mm.
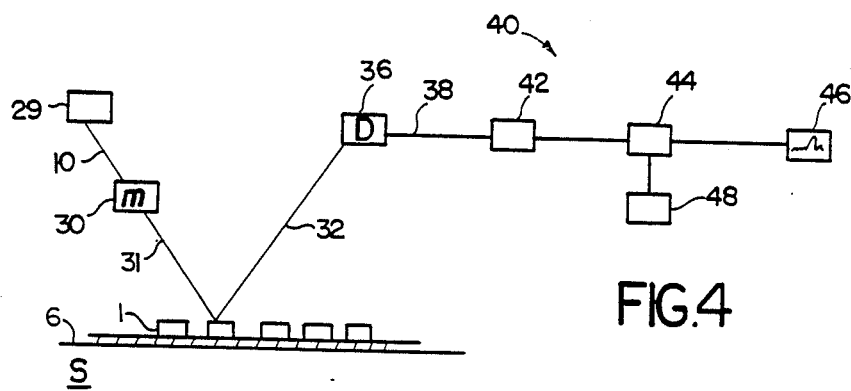
FIG.4
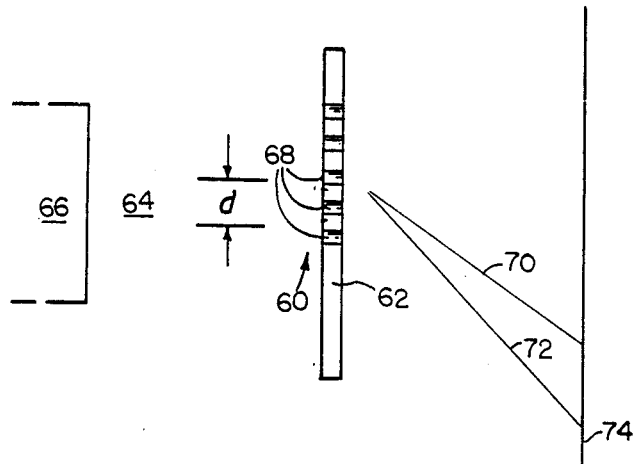
FIG.5
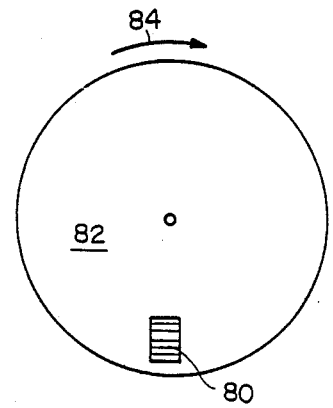
FIG.6

POLYCHROMATIC OPTICAL STRAIN GAUGE

BACKGROUND OF THE INVENTION

This invention relates to the measurement of strain and more particularly relates to the measurement of strain using optical techniques.

It is known to measure the strain and deformation of objects using extensometers or electrical resistance strain gauges. Unfortunately, dynamic systems such as rotating shafts, extreme environments, such as high temperature or corrosive gas environments, and inaccessible locations, such as large structures or small openings have proven difficult applications for these devices.

Strain measurements may also be made using optical techniques which do not require constant contact with the object to be measured nor exposure of testing apparatus components to a severe environment. The known methods utilize optical phenomena such as photoelasticity, moire interferometry, holography, speckle interferometry, heterodyning and target tracking.

In some methods for optical strain measurement, interference effects are exploited which generally make use of the properties of coherent monochromatic light to produce interference patterns correlated to the strain. An advantage of some interference methods is the ability to measure complete two dimensional strain fields For example, holography can be used for out-of-plane displacements, and moire and speckle methods for in-plane displacements.

A diffraction grating may also be placed on a substrate to be measured and illuminated with coherent, monochromatic radiation. The resulting diffraction pattern is then analyzed to determine strain.

Extensive use of optical techniques for strain measurement has been limited, however, by several disadvantages, including sensitivity to vibration, difficulty in removing the effect of rigid body motions, interference due to the natural irradiance of specimens, and the cost of optics and supporting electronics.

SUMMARY OF THE INVENTION

It is an object of the present invention to circumvent the problems of traditional strain measurement techniques and current optical methods by exploiting the diffractive properties of polychromatic radiation. In the invention, a diffraction grating on a test specimen is illuminated by a coherent, polychromatic, at least dichromatic, light source to give rise to a diffraction pattern. This pattern is a composite pattern of the maxima and minima arising from the various wavelengths incident upon the grating. An imposed strain perpendicular to the grating lines in the plane of the grating affects the grating spacing. The features of the diffraction pattern, for example, the minima and maxima, corresponding to different wavelengths of radiation change relative to each other in angle of diffraction and intensity in response to the change in grating spacing. This relative change can be correlated with strain.

The relative change between diffraction pattern features from different wavelengths is also independent of the angle of incidence of radiation upon the grating. Thus, measurement of strain independent of some rigid body motions is possible.

It is also the object of this invention to provide an optical extensometer for measuring displacements using a diffraction grating illuminated with polychromatic radiation that enables high resolution and provides a digital or analog feedback signal for strain control testing.

In one aspect, the invention provides a method for measuring strain of an object by providing the object with a diffraction grating, and illuminating the grating with radiation including at least two frequencies to produce an interference pattern corresponding to the frequencies. At least a portion of the interference pattern corresponding to one of the frequencies is detected, and analyzed to determine strain.

A feature of the invention is that detecting may comprise detecting the frequency of the radiation of the interference pattern.

Another feature is that analyzing may include comparing the detected frequency with known frequencies indicative of the strain.

Yet another feature is that the detector may be a human eye.

Another feature is that detecting may include detecting at least a portion of the interference pattern corresponding to at least two frequencies and comparing the two frequencies to known frequencies indicative of the strain.

Another feature is that the detecting may include detecting the intensity of the frequency.

In yet another feature, the interference pattern detected may correspond to at least two frequencies, and the detecting may include detecting the intensity distribution of the interference pattern for the frequencies. The analyzing may include analyzing the distribution.

Another feature is that the detecting may comprise detecting the angular position of the portion of the interference pattern.

Yet another feature is that the detecting may comprise detecting the angular position for portions of the interference pattern corresponding to at least two different frequencies, and the analyzing includes comparing the positions to determine strain. Yet another feature is that the comparing may include finding the difference between the angles and comparing the differences to known differences to determine strain.

Yet another feature includes modulating the radiation before illuminating the diffraction grating. Another feature is that the analyzing includes demodulating the signal. Another feature is that the modulating includes chopping the radiation.

Yet another feature includes the radiation to have frequencies different from emission frequencies of the object and the detecting includes detecting the different frequencies.

Another feature is that the portion of the diffraction pattern detected may be a maximum. Another feature is that the maximum may be a first order maximum.

Another feature is that the detector detects the intensity of the portion of the diffraction pattern.

In another aspect, the invention provides an apparatus for measuring strain of an object. The apparatus includes a diffraction grating fixed to the object, and a source of radiation including two frequencies for illuminating the grating and producing an interference pattern. A detector means detects at least a portion of the interference pattern corresponding to at least one of the frequencies, and an analysis means analyzes the portion of the pattern for determining the strain.

A feature of the apparatus is that the detector may detect the angular position of a portion of the interference pattern corresponding to at least two frequencies and the analyzing means compares the positions to determine strain.

Another feature is that the detector may be a frequency detector which detects the frequency of the portion of the interference pattern and the analyzing means compares the frequency to known frequencies to determine strain.

Yet another feature is that the detector may detect the intensity distribution of a portion of the interference pattern corresponding to at least two frequencies and the analyzing includes analyzing a distribution pattern.

Another feature is that the detector may be the human eye.

Yet another feature is that the apparatus may further comprise a modulator for modulating the radiation before illuminating the grating.

Yet another feature is that the modulator is a chopper.

Another feature is that the surface may be heated and in another feature the temperature of the surface is over about 1000° C. The diffraction grating may be formed of a refractory metal or ceramic.

Another feature is that grating may be electrodeposited, vapor deposited or formed integrally with the object.

Another feature is that the grating is a reflective grating or in another feature the surface is transparent to the radiation and the grating is a transmission grating.

Another feature is that the grating may be fixed on a rotating surface.

BRIEF DESCRIPTION OF THE DRAWING

FIG. 2b illustrates the effect of a rigid body rotation on diffraction phenomena in a strained grating as in FIG. 2a.

FIG. 3 illustrates the change in angular separation as a function of strain for strain measurement using the method of the invention.

FIG. 4 illustrates another embodiment of the invention in which radiation is modulated prior to impinging upon a grating.

FIG. 5 illustrates another embodiment employing a transmission grating.

FIG. 6 illustrates strain measurement on a rotating object according to the invention.

DESCRIPTION OF THE PREFERRED EMBODIMENTS

Figure 1:
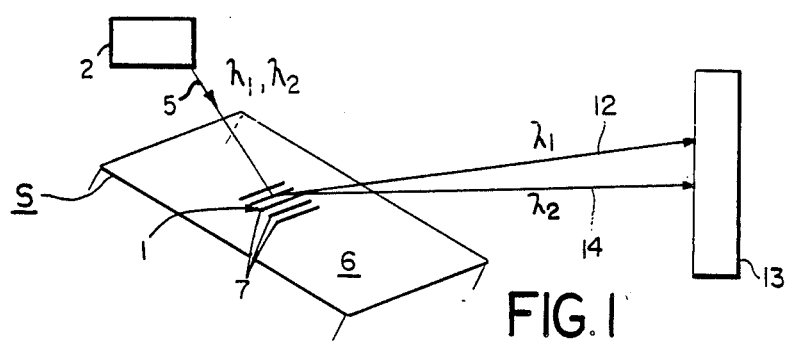
FIG. 1 illustrates a strain measurement device according to the invention.

In the invention an optical extensometer measures the effect of a strained diffraction grating upon an incident, coherent, polychromatic light source. Referring to FIG. 1, a diffraction grating 1 is oriented on a surface of substrate S which is subject to strain so that the grating lines 7 are perpendicular to the direction of deformation; a component of strain perpendicular to the grating lines will change the grating spacing Radiation 5 from a dichromatic source 2 includes, for example, at least two wavelengths (or frequencies), $\lambda$, $\lambda_2$ which illuminate the grating giving rise to an interference pattern. The pattern is a composite sum of the patterns arising from the various wavelengths in the incident radiation. The composite pattern thus includes features, for example, feature 12 from $\lambda$ and feature 14 from $\lambda_2$ which may be detected by detector 13 in the viewing field. The features 12, 14 may be a diffraction minimum or maximum or another portion of the pattern.

As the grating spacing changes in response to strain, the diffracted angle or angular position of the features of the pattern corresponding to each wavelength also change. The relative change in angular position of features from different wavelengths may then be measured to determine the amount of strain.

A particular advantage of the invention is that the diffracted angles for features from the various wavelengths are affected identically by rigid body rotations where the axis of rotation is parallel to the grating lines, but differently by strain-induced change in the grating spacing. Strain measurement may then be made free of error arising from these rigid body rotations by comparison of the angular position for features arising from at least two wavelengths.

Another advantage of the invention is that the detector may detect the relative angular position of the features or may even be a human eye detecting the color or frequency as well as the angular position of the diffracted radiation which may be correlated with a degree of strain. In the latter case, the measurement may not include a relative measurement of features from different wavelengths but, rather, detection of frequency or change in a frequency distribution at a particular angular position may provide a simple, rapid, accurate measurement of strain.

Figure 2:
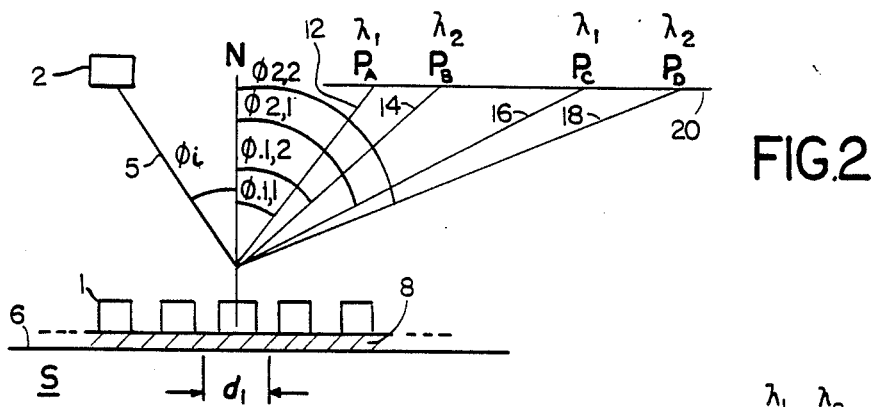
FIG. 2 illustrates interference phenomena arising from a diffraction grating on an unstrained surface when illuminated with dichromatic radiation according to the invention.
Figure 2A:
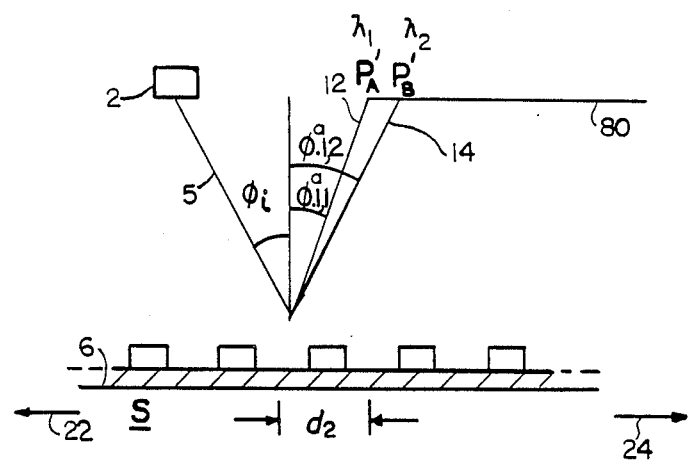
FIG. 2a illustrates diffraction phenomena as in FIG. 2 but from a relatively strained grating.
Figure 2B:
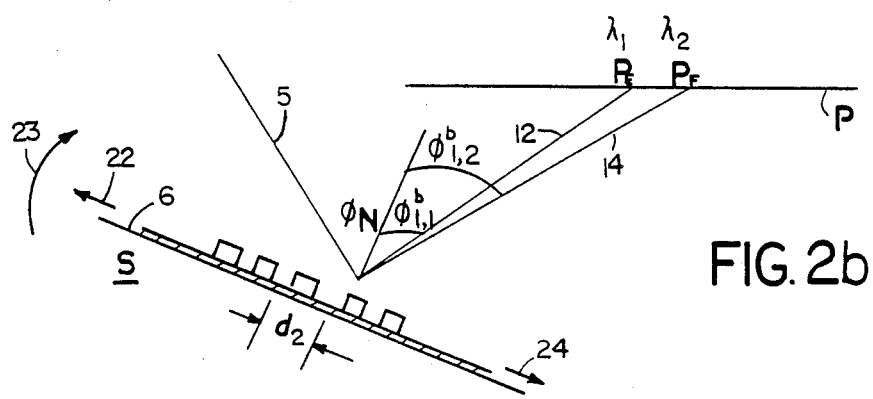

Referring to FIGS. 2–2b, diffraction using a polychromatic source according to the invention is illustrated, schematically. A diffraction grating 1 with line spacing, $d_1$, is fixed to a surface 6 of a substrate S by a securing means 8, for example, an adhesive, a weld or the like. In other embodiments the grating may be integral with or deposited onto the surface.

The strain of the substrate S is to be measured. Radiation 5 from a source 2 illuminates the diffraction grating forming a diffraction pattern comprising intensity minima and maxima. In the present example, the diffraction grating is reflective and the diffracted angle of interference maxima or minima are illustrated as 12, 14, 16, 18 which may be detected at a detection plane, 20.

The radiation 5 is incident upon the grating at an incident angle $\phi_1$ and according to the invention includes at least two wavelengths forming a diffraction pattern with features whose reflected angle is dependent thereon. As is known in the art, the diffraction patterns are alternating regions of intensity minima and maxima. The minima and maxima are by convention numbered as orders. The zeroth order corresponds to that order due to direct transmission in the case of a transmission grating, or perfect reflection in the case of a reflection grating. The first maximum and minimum in a reflection grating is determined as the first diffracted maximum and minimum encountered as the angle measured from the normal to the grating increases beyond that angle associated with the zeroth order. The second maximum is the next maximum encountered as the angle from the normal increases from the first maximum, and so on. The maxima and minima detected at angles less than that from the grating normal to the zeroth order are denoted −1 maximum, minimum, and so on.

In the example in FIG. 2-2b, the first order feature 12 for $\lambda_1$, is produced at angle $\phi_{1,1}$ and detected at a position $P_A$ at plane 20. Similarly, the first order feature 14 for $\lambda_2$, is produced at angle $\phi_{12}$ and detected at position $P_B$ and other order features, for example second order features 16 and 18 for $\lambda_1$ and $\lambda_2$, respectively may also be detected.

The basic diffraction grating equation is:

$$\sin\phi_i = \sin\phi_{1,1} + \frac{m\lambda_1}{d} \quad (1)$$

Where $\phi_1$ is the incident angle, $\phi_{1,1}$ is the reflected angle (angular position) of the first diffraction order, 12 in the diffraction pattern of $\lambda_1$, d is the grating line spacing ($d_1$ in FIG. 2, $d_2$ in FIG. 2a-b), and m is the order number.

For two wavelengths striking the grating at the same incident angle, the diffraction equation becomes:

$$\phi_{1,1} - \phi_{1,2} = \arcsin\left[\frac{m}{d}(\lambda_2 - \lambda_1)\right] \quad (2)$$

Where $\phi_{1,2}$ is the reflected angle (angular position) of the first order feature 14 of the second wavelength, $\lambda_2$. As evident from equation 2, the relative angular position of the interference features for the two wavelengths is independent of the incident angle $\phi_1$.

Referring now to FIG. 2a, as substrate S is strained perpendicular to the grating lines, the spacing of the grating lines is changed from $d_1$ to $d_2$. In the present example, strain in the direction of arrows 22, 24 causes an increase in the line spacing. The angular position $\phi_{1,1}$ and $\phi_{1,2}$ of each interference features 12 and 14 therefore, changes with grating spacing according to equation 2. The new grating spacing, or change in grating spacing can be calculated from eq (2) and related to strain. Even if the spacings are not calculated, however, the relative change in the angular position before and after strain can be compared and related to strain.

In the illustration of FIG. 2-2a, the relative change is such that the relative angular position $(\phi_1^a{}_{,1} - \phi_1^a{}_{,2})$ in the strained condition (FIG. 2a) is greater than $(\phi_{1,1} - \phi_{1,2})$ in the unstrained condition (FIG. 2). Calculation of strain from a detected surface motion is discussed in, for example, J. F. Bell, "Diffraction Grating Strain Gauge", *Proceedings, Society for Experimental Stress Analysis*, Vol. 17, number 2, p. 5. A general discussion of diffraction optics may be found in *Diffraction Gratings* by M. C. Hutley, Academic Press, 1982.

Referring now to FIG. 2b, a rigid body rotation of the substrate S, also having the same magnitude and direction (relative to the substrate) of strain as in FIG. 2a is illustrated. The substrate S has been rotated in a plane perpendicular to the grating lines (axis of rotation parallel to grating lines) as indicated by the arrow 23. In this instance the radiation 5 is incident upon the grating at a new angle, $\phi_n$ as a result of the rigid body rotation. The absolute angular position of both interference features 12 and 14 is affected according to equation (1). Feature 12, now has angular position $\phi_1^b{}_{,1}$ and feature 14, position $\phi_1^b{}_{,2}$ respectively. However, the relative angular position of the features arising from the two wavelengths, $(\phi_1^b{}_{,1} - \phi_1^b{}_{,2})$, is independent of incident angle and therefore, unaffected. The relative angular position in FIG. 2b, $(\phi_1^b{}_{,1} - \phi_1^b{}_{,2})$ is the same as in FIG. 2a, $(\phi_1^a{}_{,1} - \phi_1^a{}_{,2})$ since the substrate is in the same strain condition. If the material in FIG. 2b was unstrained as in FIG. 2, the detected relative angular position would be equal to $\phi_{1,1} - \phi_{1,2}$.

Thus, in the preferred embodiment, the method provides for measurement of the state of strain, by detecting the change in interference features arising from illumination of a grating, on the surface with radiation having at least two wavelengths. The technique is inherently free of error caused by rigid body rotation in a plane perpendicular to the grating lines. It will be understood that the relative position, intensity, or relative distribution of frequencies of the diffraction features are all affected by a strained diffraction grating and may also be detected and analyzed for determining strain.

Referring now to FIG. 3, the change in angular separation is plotted against strain for the diffracted first order feature of an incident beam from an argon laser having two wavelengths, 488 and 515 nm. The incident angle was 45° from grating normal and the diffraction grating had 500 lines per millimeter. As the diffraction spacing varies by a factor of 2, the variation in the diffracted angle changes by over 0.60 degrees. Such a relative variation can easily be detected by position sensitive devices which outputs a voltage proportional to the position of the incident light. A photodiode array or charge coupled device (CCD) detector might also be used.

In another embodiment for strain measurement, also free of rigid body rotations about an axis parallel with the grating lines, a polychromatic, for example, white light beam may be used to illuminate the grating and the intensity distribution of resulting interference features found at a given angular position. In this case, the character of the distribution, i.e., presence and intensity of certain frequencies, may be related to strain. Changes in the distribution may also be observed to differentiate strain effects from rigid body rotation effects. In the example of a white light beam, a distribution of frequencies can be detected at any given angle of diffraction. The relative frequency content of that distribution will be different given either a rigid body motion or an imposed surface strain. The character of narrowing or broadening of the distribution, (broading is reduction in intensity at the maximum frequency and enhancement at the frequencies higher and lower than the maximum) will thus differentiate strain from rigid body motions.

Another embodiment of the present invention does not require comparison of the angular position of interference features but rather strain measurement may be simply and quickly made by detection, of the frequency or distribution of frequencies in an interference feature at a single point when a plurality of wavelengths are incident upon a grating. In this instance, the absolute position of the interference feature of a given frequency may be correlated with a given degree of strain.

For example, in FIG. 2b, an observer at position $P'_A$ detecting a frequency corresponding to $\lambda_1$ would be indicative of the strain condition of material S, as illustrated. If another frequency is detected at position $P'_A$, a different strain condition would be indicated. Similarly, it may be a distribution of frequencies (the apparent color in the case of a human eye detector) that is detected.

Alternatively, the source may include a number of wavelengths, the frequency may be detected at a plurality of known position and the pattern of detected frequencies used to indicate strain. For visible light strain may be detected by the human eye. Such a scheme provides an easy and convenient method for measurement on large structures. A bridge or building, for example, could include a grating or gratings which could be strain inspected with a portable light source. It should be noted, however, that freedom from errors arising from rigid body rotations is realized by comparison of the relative position of features from different wavelengths. This type of measurement, it will also be realized, may be made using a frequency detector such as the human eye.

Preferably the grating is attached to the test material in a way which will ensure its relative motion in coordination with the material itself. The grating may be, for example, electrodeposited, or vapor deposited. The grating may also be integrally formed of the material to be measured and, for example, ruled or etched. In some embodiments, it is preferable that the grating possess high specular reflection. In others, the grating may be a transmitting grating as will be described further below. The grating may even be embedded within a material which is transparent to the illuminating radiation.

The source of radiation should supply at least two primary wavelengths and preferably coherent radiation such as that from a laser. Coherent light as is known improves the resolution of diffraction features. In other embodiments, noncoherent light might be used. In some embodiments the source may include a nonlinear crystal placed in the beam path of a monochromatic source and before the grating. Such crystals are known to transmit more than one wavelength as discussed in, for example in *Introduction to Nonlinear Optics*, by G. Baldwin, 1969, Ch. 4, p. 71-107, Plenum Press. The wavelengths of radiation may be selected so as not to coincide with natural sample irradiance or absorbance or that of the environment about the grating. The radiation may also be chopped or otherwise modulated to differentiate sample or other ambient irradiance. The wavelength of radiation and the grating spacing are also selectable to effect the resolution of the measurement and the distance of the detector from the grating affects the relative absolute angular position and magnitude of change of the diffraction features as is known. It will be recognized that both the plurality of wavelengths may illuminate the grating and the resultant features detected, either simultaneously or sequentially.

The surface to be measured may be any strained surface. Applications include strain measurement in metals, ceramics, polymers, crystalline substances, superconductors, and composite materials. Specific applications include: aircraft structures, turbines, engine components, buildings, bridges, test specimens, or railroad structures.

An important application of the invention is for the measurement of strain in high temperature environments, for example, for measurement of heat resistant ceramic materials. In this case, a pulse laser of sufficiently short period may be used so that the natural radiance of the specimen will not interfere with the diffracted light. The frequencies of the impinging radiation may also be selected as mentioned such that they are sufficiently separated from known sample radiance, thereby avoiding interference. In some high temperature strain measurements, the grating may be a refractory metal, capable of withstanding temperatures of 1000° C. or more. Examples of refractory metals include niobium and tantalum which may be, for example, deposited on the surface of the material to be measured.

Referring now to FIG. 4 an embodiment of the invention is shown wherein the radiation 10 is modulated by modulation unit 30 prior to illuminating the diffraction grating. The diffraction features 32 carry, superimposed, the characteristics of the modulation and are detected at detector 36 which produces a signal delivered along line 38 to analyzing circuitry 40. The circuitry may include, for example, demodulating processors 42 for decoding the modulation features imposed at modulator 30 and analysis circuitry 44 where the detected signal may be analyzed for determining relative motion and strain. A readout or display 46 may also be provided for real time and histographic display of results. Similarly storage means 48 may be provided for storing motion data for later manipulation.

In the present embodiment the modulator 30 may be, for example, a chopper whereby radiation produced by the grating or material itself may be discriminated against at detector 36. In another embodiment the source 29 may be a broadband source and the modulator 30 a transforming modulator, for example an interferometer for Fourier transforming. In this last embodiment the interference features for many wavelengths may be simultaneously detected by detector 36. The resulting signal is then transformed, for example Fourier transformed, by circuitry 42 prior to analysis. Fourier analysis can be used to produce a frequency distribution for example, and as discussed hereinbefore, analysis of the frequency distribution can be used for strain measurement, free of certain rigid body rotations.

Referring now to FIG. 5 in other embodiments a transmission grating may be employed. The grating 60 is formed of a substrate which is opaque to incident radiation 64 arising from source 66. Grating 60 includes apertures 68 formed in the opaque substrate 62 by way of which diffraction features 70, 72 are formed and detected, for example, at detection plane 74. Similar to the reflected diffraction embodiments, strain in the direction perpendicular to the lines 68 of the grating produces a variation in their spacing d and consequently a change in the angular position and intensity of the interference features 70, 72. Also similar to the reflective embodiment, rigid body rotation perpendicular to the lines 68 does not affect the relative position of the interference features.

Referring now to FIG. 6 a diffraction grating 80 according to the invention may be positioned on a surface 82 rotating, for example, in the direction of arrow 84. Optical strain detection according to the invention offers a particular advantage for measurement of strain of the material 82 while rotating. Since the speed of light is necessarily faster than the rotation of the material 82 the interference features may be intermittently detected upon passage of the grating beneath an incident polychromatic beam held stationary.

Many modifications and variations of the present invention are possible when considered in light of the above teachings. For example, it will be recognized by those skilled in the art that the relative intensity of the interference features from various incident wavelengths may be detected at various angular positions and compared to determine strain. It is therefore understood that the scope of the present invention is not to be limited to the details disclosed herein, may be practiced and otherwise than as specifically described.

What is claimed is:

1. A method for measuring strain of an object comprising:

providing said object with a diffraction grating, illuminating said grating with radiation including at least two frequencies to produce an interference pattern corresponding to said frequencies, detecting at least a portion of the interference pattern corresponding to one of said frequencies, and analyzing said interference pattern to determine strain.

2. The method of claim 1 wherein said detecting comprises detecting the frequency of said radiation of said interference pattern.

3. The method of claim 2 wherein said analyzing includes comparing said detected frequency with known frequencies indicative of the strain.

4. The method of claim 3 wherein said detector is a human eye.

5. The method of claim 2 wherein said detecting includes detecting at least a portion of said interference pattern corresponding to at least two frequencies and comparing said two frequencies to known frequencies indicative of said strain.

6. The method of claim 2 wherein said detecting includes the intensity of said frequency.

7. The method of claim 2 wherein said interference pattern detected corresponds to at least two frequencies, said detecting includes detecting the intensity distribution of said interference pattern for said frequencies, and said analyzing includes analyzing said distribution.

8. The method of claim 1 wherein said detecting comprises detecting the angular position of said portion of said interference pattern.

9. The method of claim 2 wherein said detecting comprises detecting the angular position for portions of the interference pattern corresponding to at least two different frequencies, and said analyzing includes comparing said positions to determine strain.

10. The method of claim 7 wherein said comparing includes finding the difference between said angles and comparing said differences to known differences to determine strain.

11. The method of claim 1 further comprising modulating said radiation before illuminating said diffraction grating.

12. The method of claim 11 wherein said analyzing includes demodulating said signal.

13. The method of claim 11 wherein said modulating includes chopping said radiation.

14. The method of claim 1 comprising selecting said radiation to include frequencies different from emission frequencies of said object and said detecting includes detecting said different frequencies.

15. The method of claim 1 wherein said portion of said diffraction pattern is a maximum.

16. The method of claim 15 wherein said maximum is a first order maximum.

17. The method of claim 1 wherein said detector detects the intensity of said diffraction pattern.

18. Apparatus for measuring strain of an object comprising:

a diffraction grating fixed to said object, a source of radiation including two frequencies for illuminating said grating and producing an interference pattern, a detector means for detecting at least a portion of said interference pattern corresponding to at least one of said frequencies, and analysis means for analyzing said portion of said pattern for determining said strain.

19. The apparatus of claim 18 wherein said detector detects the angular position of a portion of the interference pattern corresponding to at least two frequencies and said analyzing means compares said positions to determine strain.

20. The apparatus of claim 18 wherein said detector is a frequency detector which detects the frequency of said portion of said interference pattern and said analyzing means compares said frequency to known frequencies to determine strain.

21. The apparatus of claim 20 wherein said detector further detects the intensity distribution of a portion of said interference pattern corresponding to at least two frequencies and said analyzing includes analyzing a distribution pattern.

22. The apparatus of claim 20 wherein said detector is the human eye.

23. The apparatus of claim 18 further comprising a modulator for modulating said radiation before illuminating said grating.

24. The apparatus of claim 23 wherein said modulator is a chopper.

25. The apparatus of claim 24 wherein said surface is heated.

26. The apparatus of claim 25 wherein the temperature of said surface is over about 1000° C.

27. The apparatus of claim 26 wherein said diffraction grating is formed of a refractory metal or ceramic.

28. The apparatus of claim 18 wherein said grating is electrodeposited onto said object.

29. The apparatus of claim 18 wherein said grating is vapor deposited onto said object.

30. The apparatus of claim 18 wherein said grating is formed integrally with said surface.

31. The apparatus of claim 18 wherein said grating is a reflective grating.

32. The apparatus of claim 18 wherein said surface is transparent to said radiation and said grating is a transmission grating.

33. The apparatus of claim 18 wherein said grating is fixed on a rotating surface.

* * * * *